United States Patent [19]

Giebmanns

[11] 4,454,689

[45] Jun. 19, 1984

[54] CLAMPING ARRANGEMENT

[75] Inventor: Karl-Heinz Giebmanns, Westport, Conn.

[73] Assignee: ITM International Tool Machines, Inc., Westport, Conn.

[21] Appl. No.: 300,595

[22] Filed: Sep. 9, 1981

[51] Int. Cl.³ .................. B23B 33/00; B23C 3/36; B24B 3/18

[52] U.S. Cl. .................. 51/217 R; 51/237 R; 51/288; 82/40 R; 269/902; 409/226

[58] Field of Search ............... 409/221, 222, 223, 225, 409/226; 51/217 R, 288, 237 R; 269/254 CS, 902; 279/1 L; 408/112; 82/40 R; 142/53, 55, 57

[56] References Cited

U.S. PATENT DOCUMENTS

| 1,700,663 | 1/1929 | Bath .................. 51/288 |
| 2,851,831 | 9/1958 | Healy ................ 51/217 R |
| 3,311,006 | 3/1967 | Seitter ................ 82/40 R |
| 3,901,519 | 8/1975 | Lecailtel et al. ......... 279/1 L |
| 3,905,156 | 9/1975 | Vogelsanger ........... 51/288 X |

FOREIGN PATENT DOCUMENTS

| 0682326 | 8/1979 | U.S.S.R. ............. 279/1 L |
| 0784998 | 12/1980 | U.S.S.R. ............ 279/1 L |

Primary Examiner—Z. R. Bilinsky

[57] ABSTRACT

In a grinding or milling machine an improved clamping arrangement for holding one end of a tool blank having a portion with at least four sides in cross-section. The other end of the tool blank is held against a stationary holding member. The clamping arrangement includes a housing which is coaxially mounted on a drive shaft. A pair of clamping members are reciprocally mounted in the housing and are biased outwardly by means of a pair of coil springs. Each clamping member has a skewed planar surface at its free end. The skewed planar surfaces biasingly engage opposite edges of the tool blank so as to compensate for any misalignment of the tool blank with respect to the holding member and clamping arrangement.

4 Claims, 3 Drawing Figures

CLAMPING ARRANGEMENT

BACKGROUND OF THE INVENTION

Grinding or milling of tools having a square cross-section (such as for example tap drills) require a clamping arrangement which centrally clamps the portion of the tool having the square cross-section. Such clamping arrangements have, because of their complex construction, a relatively large diameter and can only be used in machines where the grinding disc or milling tool is mounted during operation transversely to the central axis of the tool. In those operations where the grinding wheel is arranged in the same direction as the central axis of the tool such as, for example when slots or grooves are to be ground along the longitudinal axis of the machine, the known clamping arrangements can not be used because the longitudinal groove or slot must generally extend up to the portion having the square cross-section and the grinding wheel would therefore cut into the chuck if the chuck exceeds a certain diameter. For this reason the grinding machines and milling machines of the state of the art have chucks which have four-sided pyramidically shaped bores (that is the bore has a square cross-section) and wherein the four sides of the pyramidically shaped bore converge inwardly so that they may clampingly hold the portion of the tool having a square cross-section which is inserted therein. This type of clamping arrangement has the drawback that, when the portion of the tool with the square cross-section has not been grindingly accurately squared, the tool will not be precisely axially clamped in the chuck.

SUMMARY OF THE INVENTION

It is therefore an object of the invention to provide a clamping arrangement for tools having square cross-sections in which the afore-described drawbacks have been eliminated.

The clamping arrangement of the invention clampingly holds the portion of the tool having the square cross-section in such a manner that any imprecision of the square cross-section of the tool, including misalignment thereof with its longitudinal axis, is compensated for by the clamping arrangement.

Moreover, the clamping arrangement of the invention is of relatively small diameter, clampingly holds the tool in alignment with the longitudinal axes of the tool and chuck and compensates for any irregularities into the square cross-section of the tool.

DETAILED DESCRIPTION

Figure 1:
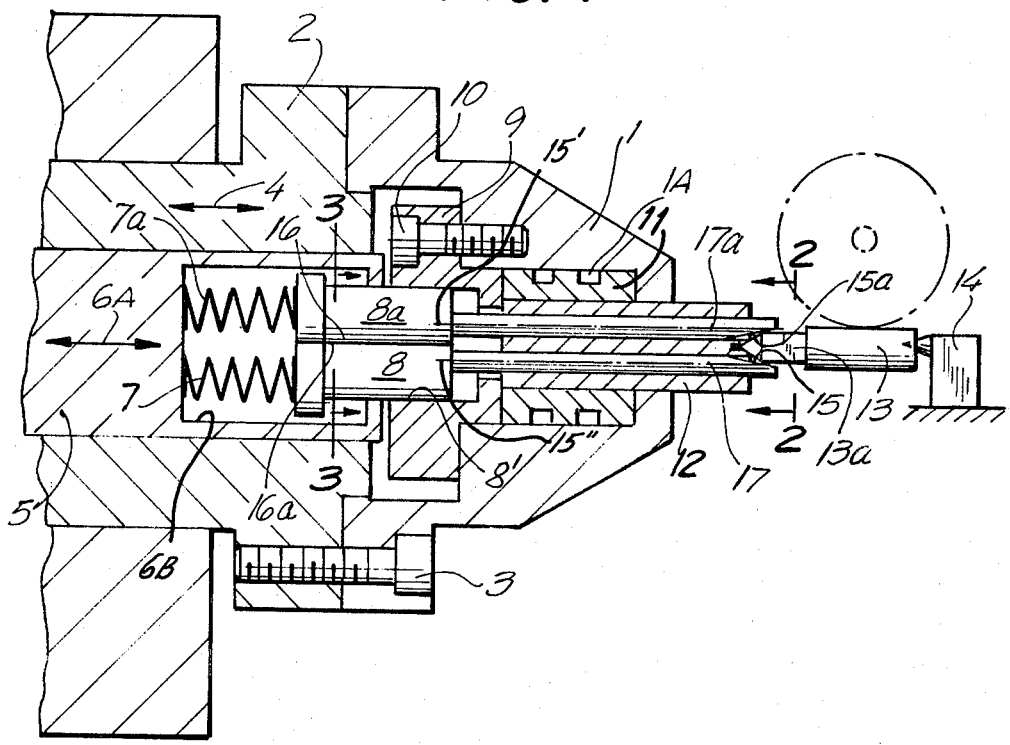
FIG. 1 illustrates the clamping arrangement of the invention in longitudinal axial cross-section, wherein a tool is shown as clampingly held.
Figure 2:
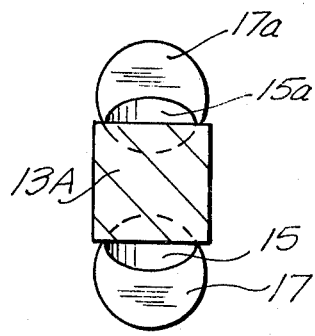
FIG. 2 is an end view of the two rods forming part of the clamping arrangement shown spaced apart and clampingly holding the portion of a tool having a square cross-section.
Figure 3:
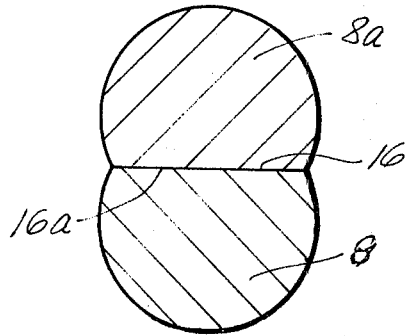
FIG. 3 is an end view along line 3—3 of FIG. 1.

The clamping arrangement of the invention includes a housing 1 which is mounted by means of threaded bolts 3 on the shaft 2 of a machine tool, which shaft drive 2 is reciprocally movable along double arrow 4. The tool blank 13, which is to be worked on, is held between a pointed member 14 and a hollow clamping member 12. A spindle 5 is independently reciprocally slidably movable along double arrow 6A within the hollow shaft 2. A pair of clamping members 8, 8a are reciprocally slidable within a bore 8' of the shaft 2. As can be seen from FIG. 3, the members 8, 8a abut against each other along their respective planar surfaces 16, 16a. Rods 17, 17a respectively axially project from and are integral with members 8, 8a. At their free ends, the rods 17, 17a respectively have equally angularly machined skewed end planar surfaces 15, 15a. These planar surfaces serve to clampingly hold the portion of the tool blank having a square cross-section. Since the planar surfaces 16, 16a abut, the surfaces 15, 15a are respectively maintained mutually parallel with each other, so that surfaces 15, 15a can not angularly rotate about the respective axes 15', 15" of the rods 17, 17a. Springs 7 and 7a are mounted in chamber 6B and bias the rods 17, 17a outwardly until their surfaces 15, 15a contact the portion 13A of the tool having the square cross-section. The cover 9 holds the sleeve 11 in operative position in a bore 1A of the housing 1 via a plurality of threaded bolts 10 threadably mounted in said housing.

By biasingly mounting the member 8, 8a the surfaces 15, 15a contact the square portion 13A of the tool in such a way that any irregularities from a perfect axially aligned square are compensated for by their engagement.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In a grinding machine, an improved clamping arrangement for a longitudinal tool blank having a portion with an even number of sides in cross-section, the improvement comprising,
   holding means adapted to engage one end of said longitudinal tool blank along its longitudinal axis;
   clamping means being operatively mounted on a drive shaft which is reciprocally movably mounted in said grinding machine;
   said clamping means include a housing having a first bore which is axially aligned with said holding means and said tool blank which is adapted to be clamped therebetween;
   a pair of clamping members reciprocally mounted in said housing;
   biasing means operatively connected to said pair of clamping members and adapted to bias them into engagement with said portion of said tool blank having an even number of sides;
   said pair of clamping members including a pair of rods which remain in contact with and support the tool blank during the grinding operation and further which extend parallel to and equidistantly spaced from said longitudinal axis; each rod having at its free end a planar surface which is equiangularly skewed with respect to the longitudinal axis, so that, said clamping means can accomodate said tool blanks of different widths; said planar surface being adapted to engage an edge of the end of the portion of said tool blank having an even number of sides in cross-section.

2. In a grinding machine, the improved clamping arrangement as set forth in claim 1, wherein said pair of clamping members have identical circular cross-sections and each member includes a planar surface which extends parallel to the longitudinal axis of the clamping member, the planar surfaces of the pair of clamping members mutually slidably contacting each so as to prevent an angular displacement of each clamping member about its respective longitudinal axis.

3. In a grinding machine, the improved clamping arrangement as set forth in claim 2, wherein the biasing means includes a pair of coil springs, each coil spring being operatively connected to one clamping member and each coil spring acting parallel to the longitudinal axis of the tool blank.

4. In a grinding machine, the improved clamping arrangement as set forth in claim 3, including a spindle sleeve axially reciprocally mounted in said shaft and including a second bore at its free end in which said coil springs and said pair of clamping members are operatively mounted; the second bore being axially aligned with the first bore.

* * * * *